United States Patent
Liu et al.

(10) Patent No.: US 7,732,084 B2
(45) Date of Patent: Jun. 8, 2010

(54) SOLID OXIDE FUEL CELL WITH INTERNAL REFORMING, CATALYZED INTERCONNECT FOR USE THEREWITH, AND METHODS

(75) Inventors: Di-Jia Liu, Naperville, IL (US); Jie Guan, Torrance, IL (US); Nguyen Minh, Fountain Valley, CA (US)

(73) Assignee: General Electric Company, Schenectady, NY (US)

( * ) Notice: Subject to any disclaimer, the term of this patent is extended or adjusted under 35 U.S.C. 154(b) by 1199 days.

(21) Appl. No.: 10/708,042

(22) Filed: Feb. 4, 2004

(65) Prior Publication Data

US 2005/0170234 A1 Aug. 4, 2005

(51) Int. Cl.
*H01M 4/00* (2006.01)
*H01M 8/12* (2006.01)

(52) U.S. Cl. .......................... 429/38; 427/115; 429/40; 429/44

(58) Field of Classification Search ................ 429/38, 429/40, 44; 427/115
See application file for complete search history.

(56) References Cited

U.S. PATENT DOCUMENTS

| | | | |
|---|---|---|---|
| 4,182,795 A * | 1/1980 | Baker et al. ................ 429/13 |
| 4,548,876 A * | 10/1985 | Bregoli ........................ 429/39 |
| 4,567,117 A * | 1/1986 | Patel et al. ................... 429/19 |
| 4,647,516 A | 3/1987 | Matsumura et al. ........... 429/19 |
| 4,702,973 A | 10/1987 | Marianowski ............... 429/41 |
| 5,075,277 A | 12/1991 | Saiai et al. .................. 502/333 |
| 5,496,655 A | 3/1996 | Lessing ....................... 429/34 |
| 5,660,941 A | 8/1997 | Farooque et al. ............. 429/19 |
| 6,051,329 A | 4/2000 | Fasano et al. ................. 429/30 |
| 6,051,330 A | 4/2000 | Fasano et al. ................. 429/30 |
| 6,492,045 B1 | 12/2002 | Blanchet et al. .............. 429/20 |
| 6,576,199 B1 | 6/2003 | Liu et al. .................... 422/177 |
| 2002/0197518 A1* | 12/2002 | Blanchet et al. .............. 429/20 |
| 2005/0053819 A1* | 3/2005 | Paz .............................. 429/32 |

FOREIGN PATENT DOCUMENTS

JP 06068887 A * 3/1994

* cited by examiner

*Primary Examiner*—Tracy Dove
(74) *Attorney, Agent, or Firm*—Sutherland Asbill & Brennan LLP

(57) ABSTRACT

A catalyzed interconnect for an SOFC electrically connects an anode and an anodic current collector and comprises a metallic substrate, which provides space between the anode and anodic current collector for fuel gas flow over at least a portion of the anode, and a catalytic coating on the metallic substrate comprising a catalyst for catalyzing hydrocarbon fuel in the fuel gas to hydrogen rich reformate. An SOFC including the catalyzed anodic inter-connect, a method for operating an SOFC, and a method for making a catalyzed anodic interconnect are also disclosed.

8 Claims, 3 Drawing Sheets

SOLID OXIDE FUEL CELL WITH INTERNAL REFORMING, CATALYZED INTERCONNECT FOR USE THEREWITH, AND METHODS

FEDERAL RESEARCH STATEMENT

This invention was made with government support under DE-FC26-01NT41245 awarded by the Department of Energy. The Government has certain rights in the invention.

BACKGROUND OF INVENTION

Solid oxide fuel cells (SOFC) have demonstrated great potential for future power generation with high efficiency and low emission. Due to relatively high operating temperature and stable electrolyte material, SOFCs can be operated with the hydrocarbon reformate fuel containing higher carbon monoxide and carbon dioxide content than other types of fuel cell systems. Furthermore, the SOFCs can be integrated with a gas turbine to further enhance the overall system efficiency through co-generation.

At present, an SOFC stack generally requires an upstream, separate reforming process when hydrocarbons such as natural gas, gasoline, diesel, jet fuel, and the like, are used as fuel for the SOFCs. External reforming converts hydrocarbons into a mixture containing hydrogen and carbon monoxide, carbon dioxide, etc., which is also known as reformate. The reformate is subsequently fed into the anode side of the SOFC stack and is converted to electric energy through the electrochemical reaction at the surface of the electrode.

Types of reforming processes include catalytic partial oxidation (CPOX), autothermal reforming (ATR) and steam reforming (SR). Such external reforming processes invariably add volume, cost and operating complexity into the total SOFC power generation system. Moreover, they often consume additional energy in the process of converting hydrocarbons. For example, CPOX and ATR processes require mixing oxidizing gas with hydrocarbons so that a portion of the hydrocarbons is oxidized to generate sufficient heat for the overall catalytic process. External steam reforming is an endothermic process and requires a heat source, which is typically a separate combustor that consumes additional fuel. Alternatively, the thermo energy released from an SOFC stack can be utilized to drive the SR reaction through a costly heat exchanger. Ideally, the hydrocarbon reforming process should be carried out inside the SOFC stack through so-called "internal reforming."

SOFCs typically operate at above 700° C. which is a suitable temperature for steam reforming. Heat generated through electro-catalytic oxidation over electrodes and ohmic resistance over electrolyte in an SOFC can be utilized to drive the reforming reaction. Therefore, the internal reforming process does not need a costly external device.

There are several challenges currently existing in the internal reforming approach. The first one is a lack of catalytic surface area for sufficient reforming activity. The current practice in internal reforming relies on the heterogeneous reaction occurring on the anode side of an SOFC. The mixture of hydrocarbons and steam react catalytically at the surface of the anode to form hydrogen and carbon monoxide, followed by the electro-catalytic oxidation with oxygen anions. Since the anode in an SOFC usually consists of low surface area cermet material as the result of the type of metal oxide used and high temperature preparation, the catalyst area by anode alone is not sufficient for the reforming need.

The second challenge in internal reforming is the formation of carbonaceous deposit over the surface of the anode, which normally contains nickel. This is the result of dehydrogenation polymerization occurring at elevated temperature. This problem is compounded when liquid hydrocarbon fuels are used. The carbon formation blocks fuel passage to active sites in the anode and results in performance decay of SOFC. New anode materials replacing nickel with ceria and copper are being developed to avoid carbon deposition while promoting direct hydrocarbon oxidation. However, low activity of copper and complexity of fabrication will probably limit the practical application of these anode materials. Another way to reduce carbon formation on an SOFC anode is to add steam into the hydrocarbon fuel to remove carbonaceous deposit through steam reforming. However, since an Ni-ZiO$_2$ based anode is not optimized for steam reforming reaction, a high steam to carbon ratio is needed to make the process effective. Therefore, a method that could significantly improve steam forming efficiency inside an SOFC stack with no carbon deposit on the anode surface is highly desirable.

U.S. Pat. No. 6,051,329 discloses a method of forming an SOFC anode layer with high porosity and added precious metals to improve the catalytic surface area and reactivity for internal reforming. Such a method has intrinsic drawbacks as (a) it substantially increases the cost of an SOFC due to the usage of precious metals and (b) it increases the chance of carbonaceous deposit formation directly over the porous anode thus hinders the fuel mass transfer for effectively electro-oxidation. It is therefore desirable to develop method of internal reforming that will not be costly and will not generate carbon deposit blockage over the anode surface.

Interconnect plates with intermetallic compositions such as NiAl or Ni$_3$Al which can catalyze steam reforming of hydrocarbons were disclosed in U.S. Pat. No. 5,496,655. This method requires fabrication of the bipolar interconnection plate by mixing the nickel and aluminum powders with ceramic filler, followed by high pressure compression and high temperature treatment. Such a method will produce intermetallic bipolar plate with higher surface area usable for internal fuel reforming. There are, however, disadvantages of this method such as (a) a high pressure compression method that requires expensive equipment and added energy cost for the production, (b) a ceramic filler in the intermetallic composite that causes increase of the electric resistance, and (c) severely deactivated internal reforming activity due to the surface carbon deposit since the majority of the catalytic surface is embedded inside of the interconnection plate. It is therefore desirable to develop a new type of interconnection plate with catalytic reforming activity which can be made through low cost production method. It is further desirable to develop the catalyzed interconnection plate with high electric conductivity so that the catalytic function will not be easily affected by carbon formation.

SUMMARY OF INVENTION

This invention addresses the above described need in the art by providing a catalyzed interconnect for placement between an anode and a current collector in a fuel cell. The catalyzed interconnect is coated with a catalytic coating comprising a catalyst for catalyzing conversion of hydrocarbon fuel to hydrogen rich reformate within a fuel cell. This interconnect improves efficiency of internal reforming of hydrocarbon fuels in an SOFC by providing enhanced geometrical and catalytic surface areas through an offset fin design and refractory oxide coating at various thickness. It also minimizes carbonaceous deposit on the surface of the SOFC anode by carrying out the catalytic reforming reaction away from the electrodes. A preferred catalyst is a steam reforming catalyst.

More particularly, the catalyzed anodic interconnect of this invention electrically connects an anode and anodic current collector in an SOFC and comprises a metallic substrate which provides space between the anode and the anodic current collector for fuel gas flow over at least a portion of the anode. The anodic interconnect further comprises a catalytic coating on the metallic substrate comprising a catalyst for catalyzing conversion of hydrocarbon fuel in the fuel gas to hydrogen rich reformate.

This invention also encompasses a solid oxide fuel cell with internal reforming comprising the above-described anodic interconnect, a cathode, an anode, electrolyte disposed between the anode and cathode, a cathodic current collector, an anodic current collector, and a cathodic interconnect. The cathode, anode and electrolyte are disposed between the cathodic current collector and the anodic current collector. The cathodic interconnect electrically connects the cathode to the cathodic current collector and comprises a metallic substrate which provides space between the cathode and the cathodic current collector for oxygen containing gas flow over at least a portion of the cathode. The metallic cathodic interconnect substrate provides stable electric conductivity at SOFC operating temperature. It also has an offset-fin configuration that constantly redistributes the oxygen containing gas flow pattern and improves the mass transfer from gas phase to the surface of the cathode.

In addition, this invention encompasses a method for operating an SOFC comprising feeding an oxygen containing gas adjacent a cathode in the SOFC and feeding a hydrocarbon fuel through a fuel flow path in the SOFC. The fuel path is bounded at least in part by an anode, an anodic current collector, and a catalyzed anodic interconnect such as described hereinabove. The hydrocarbon fuel flows through the space between the anode and the anodic current collector and over at least a portion of the anode and the catalytic coating on the metallic substrate of the anodic interconnect catalyzes conversion of the hydrocarbon fuel in the fuel gas to hydrogen-rich reformate and the reformate is oxidized at the anode to generate electric power. The metallic anodic interconnect substrate provides stable electric conductivity at SOFC operating temperature. It also has an offset-fin configuration that constantly redistributes the fuel gas and reformate flow pattern and improves the mass transfer from gas phase to the surface of the anode.

Furthermore, this invention encompasses a method for making a catalyzed anodic interconnect for use in an SOFC comprising providing a metallic substrate configured to provide space between an anode and anodic current collectors in the SOFC for fuel gas flow over at least a portion of the anode, pretreating a surface of the metallic substrate to increase the hydrophilicity of the metallic substrate, and coating the metallic substrate with a catalytic coating comprising a catalyst for catalyzing conversion of hydrocarbon fuel to hydrogen rich reformate. A preferred catalyst is a steam reforming catalyst. According to one embodiment, the step of coating comprises coating the metallic substrate with an aqueous mixture comprising water, a catalyst precursor, a catalyst support, a catalyst promoter, and a binder, drying the aqueous mixture on the metallic substrate, and thereafter calcining the metallic substrate. According to another embodiment, the step of coating comprises coating the metallic substrate with an aqueous mixture comprising water, a catalyst support, and a binder, drying the aqueous mixture on the metallic substrate, calcining the coated metallic substrate, applying to the coated metallic substrate a solution including a catalyst precursor and a catalyst promoter precursor, and drying the solution on the coated metallic substrate, and calcining the coated metallic substrate to convert the catalyst precursor to the catalyst.

Other objects, features, and advantages of preferred embodiments of this invention are described or illustrated in the following detailed description of embodiments, claims, and drawings.

DETAILED DESCRIPTION

As summarized above, this invention encompasses a catalyzed anodic interconnect, a solid oxide fuel cell with internal reforming including such a catalyzed anodic interconnect, a method for operating an SOFC, and a method for making a catalyzed anodic interconnect. Embodiments of this invention are described in detail below and illustrated in FIGS. 1-4.

Figure 1:
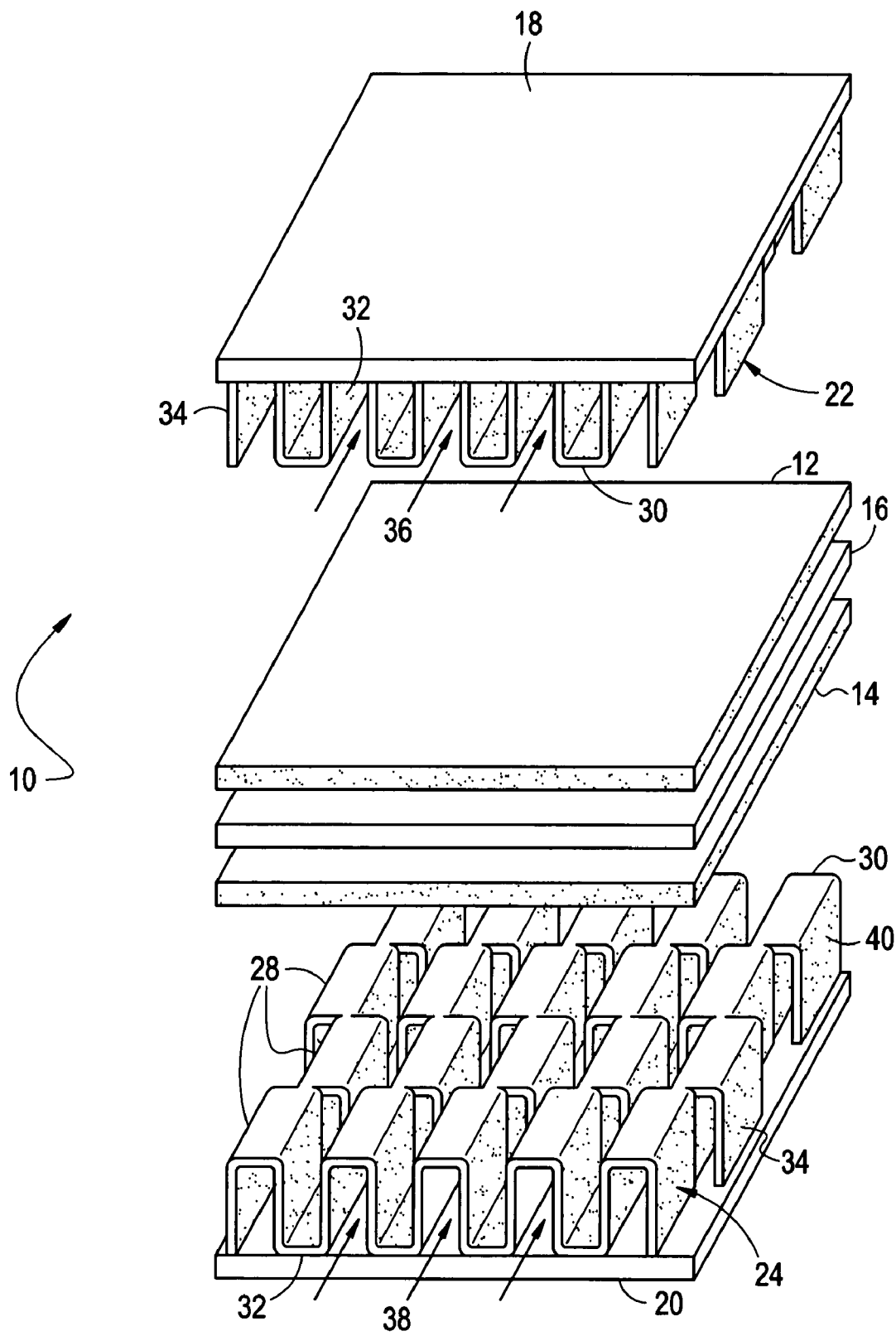
FIG. 1 is an exploded perspective view of an SOFC made in accordance with an embodiment of the present invention.

A single SOFC cell 10 made in accordance with an embodiment of this invention is illustrated in FIG. 1 and has integrated internal reforming capability. Generally, the SOFC 10 comprises a cathode 12, an anode 14, solid electrolyte 16 disposed between the anode and the cathode, a cathodic current collector 18, an anodic current collector 20, a cathodic interconnect 22, and an anodic interconnect 24.

The cathode 12 is in the form of thin ceramic layer and is suitable for fuel cell operation. It is desirably made of lanthanum strontium manganite (LSM), lanthanum strontium ferrite (LSF), and cobaltites. The anode 14 is also in the form of a ceramic plate and is suitable for fuel cell operation. Desirably, the anode 14 comprises a nickel-yttria-stabilized zirconia (YSZ)—cermet, which is derived from nickel oxide and yttria-stabilized zirconia (YSZ) composite. Such anodes are well known to those skilled in the art.

The electrolyte 16 is deposed between the cathode 12 and the anode 14 and is desirably a solid electrolyte made of dense YSZ material, although other electrolyte materials can be used. Such electrolyte materials are well known to those skilled in the art.

The cathodic current collector 18 and the anodic current collector 20 are made of electrically conducting materials such as a metal plate or metal foil. Desirably, the cathodic current collector 18 and the anodic current collector 20 are made of metals such as SS446 (stainless steel), SS430 (stainless steel), AL453, E-Brite available from Allegheny Ludlum Corporation, Crofer 22 available from ThyssenKrupp VDM, or Fecralloy available from Goodfellow. The cathode 12, the anode 14, and the solid electrolyte 16 are disposed between the cathodic current collector 18 and the anodic current collector 20 to form a complete SOFC module as illustrated in FIG. 1, although the SOFC 10 can take other shapes.

The cathodic interconnect 22 electrically connects the cathode 12 to the cathodic current collector 18 and comprises a metallic substrate 26 which spaces the cathode from the cathodic current collector. This forms a flow field between the cathode 12 and the cathodic current collector 18 for flow of an oxygen containing gas, such as air, over at least a portion of the cathode.

The anodic interconnect 24 electrically connects the anode 14 to the anodic current collect 20 and also comprises a metallic substrate 26 which spaces the anode from the anodic current collector. This forms a fuel flow-field between the anode 14 and the anodic current collector 20 for fuel gas flow over at least a portion of the anode.

The metallic substrate 26 of the cathodic and anodic interconnects 22 and 24 are made of electrically conductive material and desirably made of metal plate or foil. More desirably, the metallic substrates 26 are made of high temperature stainless steel such as SS446, SS430, AL453, E-Brite, Crofer 22, or Fecralloy.

Figure 2:
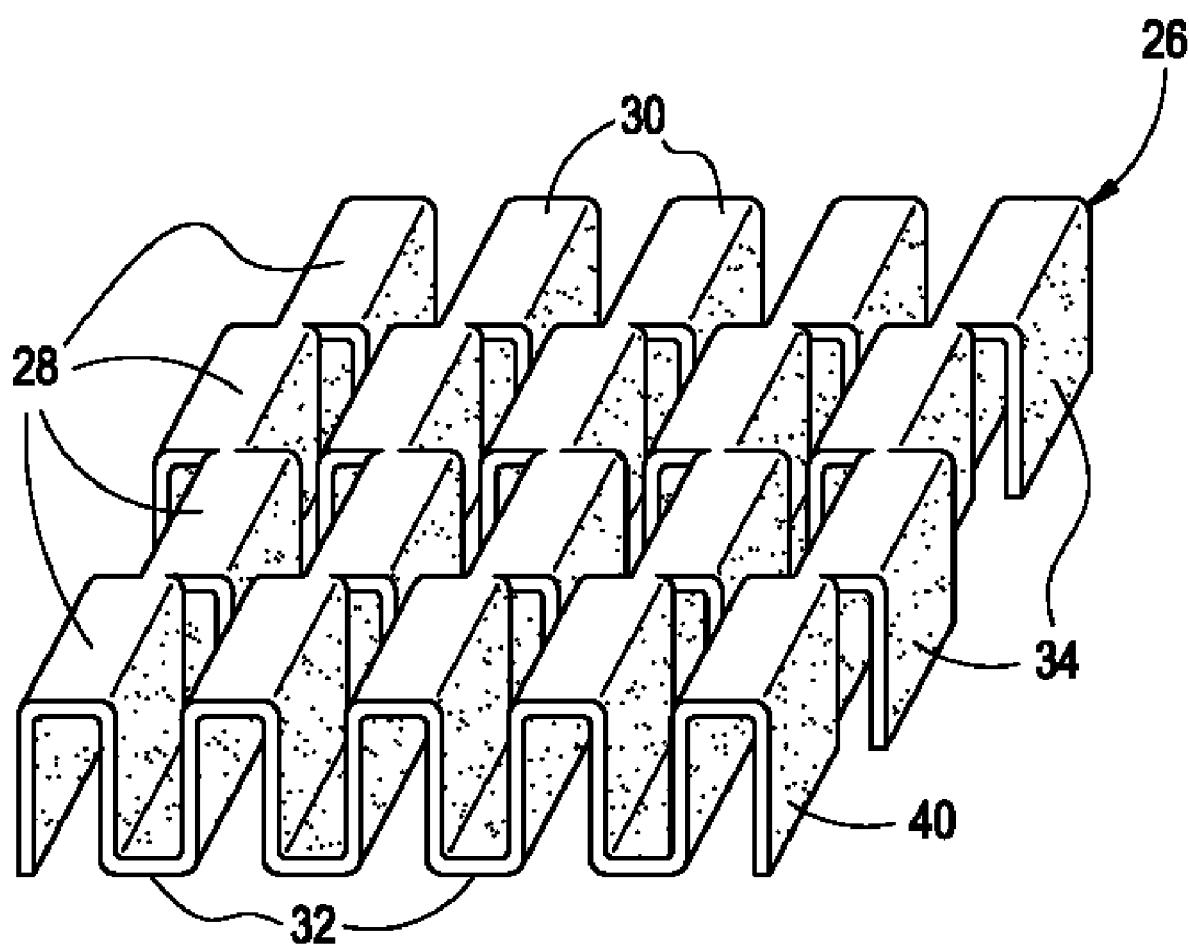
FIG. 2 is a perspective view of a catalyzed anodic interconnect in FIG. 1.

The metallic substrate 26 of the cathodic and anodic interconnects 22 and 24 is as illustrated in FIGS. 1 and 2 and comprises rows of offset plate fins 28. The rows of offset plate fins 28 have a square wave cross-section and adjacent rows of fins are offset from one another by a half-square wave. Each of the rows of offset plate fins 28 includes a first uncoated portion 30 for electrical connection to the respective electrode, a second uncoated portion 32 for electrical connection to the respective current collector, and a spacing portion 34 extending perpendicularly between the first and second uncoated portions for spacing the respective electrode from the respective current collector. In an alternative embodiment of the invention, the surface of spacing portion 34 can be dimpled to create an uneven surface. Such surface configuration will further improve the turbulence in both anode and cathode sides.

The cathodic interconnect 22 is generally not catalyst coated, but at least the first and second portions 30 and 32 of the metallic substrate 26 should remain uncoated. The first uncoated portion 30 of the cathodic interconnect 22 is in direct electrical contact with the cathode 12 and the second uncoated portion 32 of the cathodic interconnect is in direct electrical contact with the cathodic current collector 18. Likewise, the first uncoated portion of the anodic interconnect 24 is in direct electrical contact with the anode 14 and the second uncoated portion 32 of the anodic interconnect is in direct electrical contact with the anodic current collector 20. At least a portion of the cathode 12 and at least a portion of the anode 14 remain un-obstructed by the respective interconnects 22 and 24. The cathode interconnect 22 forms an air flow path 36 between the cathode 12 and the cathodic current collector 18 and the anodic interconnect 24 forms a fuel flow path 38 between the anode 14 and the anodic current collector 20.

Figure 3:
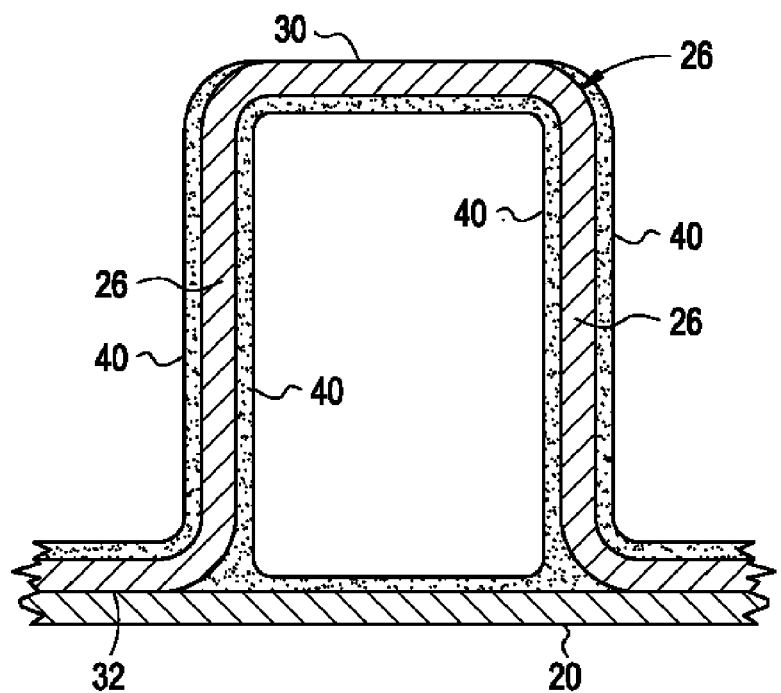
FIG. 3 is a partial schematic illustration of a portion of the anodic interconnect in FIGS. 1 and 2.

As best illustrated in FIG. 3, the anodic interconnect 24 further comprises a catalytic coating 40. FIG. 3 illustrates a cross-section of one of the rows of offset plate fins 28 which form the metallic substrate 26 of the anodic interconnect 24. With the exception of the first and second uncoated portions 30 and 32, the surface of the metallic substrate 26 is coated with the catalyst coating 40. The uncoated surfaces 30 and 32 ensure good electric contact to the anode 12 and the anodic current collector 20.

The catalyst coating 40 comprises three main components, a support material, a catalytic promoter, and a catalyst.

Suitable catalyst support materials include refractory metal oxides with high specific surface area. Preferred catalyst support materials include alumina, silica, aluminum silicate, and other transition metal silicates. A preferred catalyst support material is alumina with different crystallinity phases including alpha, gamma and delta phases. Another preferred catalyst support is alumina stabilized at high temperature (T>800° C.), such as alpha alumina, or gamma alumina doped with the elements from alkaline earth and lanthanum groups such as barium calcium, lanthanum, etc. The specific surface area provided by the support material ranges from 15 to 300 square meters per gram.

Suitable catalytic promoters include alkaline metal oxides and alkaline earth metal oxides. In particular, desirable catalytic promoters include potassium oxide, magnesium oxide, and calcium oxide. Other types of metal oxides can also be used as a catalytic promoter for the internal reforming reaction. For example, cerium oxide is useful for internal fuel reforming when precious metals such as platinum or rhodium are used in the catalytic coating.

Suitable catalysts are those that catalyze conversion of hydrocarbon fuel to hydrogen rich reformate such as syngas, but steam reforming catalysts are preferred. An SOFC operates in the temperature range from 600 to 1000° C. at ambient pressure or higher and this is a favorable reaction condition for steam reforming. Desirable catalysts include transition metals and precious metals. In particular, desirable catalysts in the transition metal group include nickel, cobalt, copper, chromium, iron, and the like and desirable catalysts in the precious metal group include ruthenium, platinum, rhodium, palladium, and the like. The transition metals and precious metals are typically in their oxidated form when the coating is first formed and gradually convert to zero valence metallic form after a period of operation under the reductive anode environment. Typically, one or both transition metal or precious metal elements are employed as a catalyst in the catalyst coating. When more than one element is used as the catalyst, a metal alloy can be formed as the catalyst crystallite.

The catalytic coating 40 can be prepared and applied in different ways known to those skilled in the art, but according to a preferred embodiment, the anodic interconnect 24 is made by a method generally comprising shaping the metallic substrate 26, pretreating the surface of the metallic substrate, preparing a binder, preparing a coating slurry, coating the metallic substrate with the coating 40, and catalyzing the coating.

The metallic substrate 26 is shaped or configured to have an offset plate fin geometry from a metal plate or foil. The metal substrate 26 can be formed by a cost effective industrial process including stamping a metal sheet or foil into the final square wave shape by using preshaped molds or dies, as is known in the art. It is possible to shape the metallic substrate 26 after coating with the catalytic coating 40, but the metallic substrate is preferably shaped before applying the catalytic coating. Also preferably, the metallic substrate 26 is brazed or otherwise fixed to the anodic current collector 20 before application of the catalytic coating 40.

The metallic substrate 26 is pretreated to clean the surface of the metallic substrate and improve the hydrophilicity of the metallic substrate. Residual oil and dust on the metallic substrate are first removed by general cleaning such as by washing with water and detergent. Following washing and drying, the metallic substrate is washed with concentrated nitric acid desirably ranging from 1 to 15 normal at room temperature to further remove rust or unevenly distributed oxide. Washing with the concentrated nitric acid will also passivate the metal surface. After the acid washing, the metallic substrate is heated in flowing air at a temperature from 200 to 600° C. for 30 to 120 minutes. This forms a uniform metal oxide layer on the metallic substrate and renders the metallic substrate more hydrophilic and easy to bind with metal oxide support in the later stage of wash coating and calcination steps.

The first step in preparing the catalytic coating is preparation of a binder. Aluminum oxide powder such as gamma alumina or a mixture of alumina and alumina hydroxide, known as boehmite, is used in preparation of the binder. Concentrated nitric acid (15 normal) is gradually added to distilled water in a reactor while the solution is agitated continuously. The weight percent of nitric acid ranges from 8% to 32% and is distilled from 40% to 90% of the final mixture weight including the aluminum oxide powder. After the acid solution is totally mixed, aluminum oxide powder is gradually added while the mixture is vigorously agitated. The weight percent of the aluminum oxide in the final mixture ranges from 2% to 8%. In a preferred embodiment, the weight percent of aluminum oxide ranges from 4% to 6%. The weight percent of concentrated nitric acid ranges from 16% to 24%, balanced by distilled water in the final mixture. After the mixing is complete, the temperature of the reactor is raised from ambient to within the range of 60 to 120° C. In a preferred embodiment, the reactor temperature ranges from 80 to 100° C. The mixture is continuously agitated and refluxed at the reaction temperature from 4 to 10 hours until all the powder is dissolved and the solution becomes translucent.

Next, a coating slurry is prepared. A wash coat slurry is prepared by mixing a binder with gamma alumina or pseudoboehmite powder, followed by extensive agitation at ambient temperature until the powder is completely suspended in the slurry mixture. The weight percent of the binder in the mixture ranges from 10% to 30%. The weight percent of the alumina or boehmite powder in the mixture ranges from 10% to 30%. The remaining portion is balanced by distilled water. In a preferred embodiment, the weight percent of the binder in the mixture ranges from 15% to 25% and the weight percent of the alumina or suitoboehmite powder in the mixture ranges from 15% to 25%, balanced by distilled water. The time of agitation ranges from 2 to 10 hours. The agitation can be completed in a batch reactor with standard agitators known in the art, such as a propeller agitator. Ultimately, the mixing and agitation can be performed by ball mill or jet mill, which are also known in the art. After agitation, the pH of the slurry ranges from 3.0 to 4.0. The density ranges from 1.1 to 1.25 grams per cubic centimeter and the viscosity ranges from 5 to 15 centipose.

According to one embodiment of the invention, a catalyst precursor in the form of a metal salt solution can be added to the binder and alumina mixture during the slurry preparation step. Catalyst precursors can be those of transition metal or precious metal salts that do not contain chlorine. Desirable examples include salts in the form of nitrate, citrate, sulfate, sulfite, and the like. The relative weight percent of the metal in reference to the amount of aluminum oxide used in the slurry ranges from 0.5 to 30%. In a preferred embodiment, the relative weight percent of the metal in reference to the amount of aluminum oxide used in the slurry ranges from 0.5% to 7% for precious metal precursors and 1% to 20% for transition metal precursors. The advantage of this approach is that the catalyzing step can be omitted after washing and calcination.

Yet in another embodiment of this invention, the precursor of the catalytic promoter can be mixed with the slurry in the form of a salt solution. Desirable salts can be in the nitrate, citrate, acetate, and other non-chlorine containing forms. Desirable examples include potassium nitrate, potassium citrate, potassium acetate, calcium nitrate, barium nitrate, magnesium nitrate, and the like.

In still another embodiment of the invention, the slurry can be made by mixing the binder with other metal oxide mixtures including aluminum oxide as one component. A mixture of metal oxide and alumina oxide is in the powder form before being mixed with a slurry. Desirable examples include NiO/$Al_2O_3$, CoO/$Al_2O_3$, NiO/MgO/$Al_2O_3$, and the like.

Next, the metallic substrate 26 of the anodic interconnect 24 is coated and the catalyst support layers formed. The slurry prepared in the previous step is coated over the metal substrate with methods commonly known in the art. For example, the metal substrate can be coated by dipping the substrate into the slurry, followed by blowing the coated metal substrate with air to remove the excess slurry from the surface of the metal substrate to prevent uneven distribution of the coating, it is also preferred that the metal substrate be rotated slowly with different orientation during the drying process. Other suitable methods include drying, painting, brushing, and the like. Before the coating step, the portion of the interconnect 24 opposite the anodic current collector 24 is masked so that the first uncoated portion 30 of the metallic substrate remains uncoated. The mask can be removed after the coating step.

In an alternative embodiment, the first uncoated surface 30 of the coated interconnect 24 can be achieved through polishing away the coated oxide layer after the coating and calcination steps.

After coating the metal substrate, the metal substrate and coating layer are dried and then calcined at an elevated temperature in flowing air. The calcination converts partially hydrolyzed aluminum oxide, aluminum hydroxide and pseudoboehmite into the form of gamma alumina or alpha alumina, depending the calcination temperature. This hardens the coating so that the coating has enhanced mechanical strength. Meanwhile, the chemical bond of M—O—Al is also formed at the interface of the coating and the metal substrate and substantially improves the coating adhesion. (M refers to a plurality of metal elements in the metallic substrate 26).

After calcination, the coated layer consists of high surface alumina having a layer of thickness from 5 to 30 microns for a single coat. The calcination temperature ranges from 450° C. to 850° C., and preferably ranges from 500° C. to 800° C. The calcination process lasts from 2 to 6 hours.

After calcination, the coated substrate can be either catalyzed in the next step or recoated with the same slurry should a coating of greater thickness be needed. Alternatively, the initial coating can be used as an under layer and coated with another type of metal oxide or catalyst slurry which can be not be coated directly on the metal surface.

Finally, the coated layer 40 of the anodic interconnect 24 is catalyzed. The catalyzing process is required if the slurry used in the coating step does not include a catalyst precursor or a catalyst/aluminum mixture as described in an alternative slurry preparation step. The catalyzing process can be accomplished by a metal impregnation process known to those skilled in the art. Briefly, the coated anodic interconnect 24 is immersed in a solution containing the catalyst metal precursor. The catalyst precursors should be those of precious metal or transition metal salts that do not include chlorine. Examples include salts in the form of nitrate, citrate, sulfate, sulfite, and the like. In a preferred embodiment, the catalyst precursors are dissolved in aqueous solutions. After the coating is completely wetted by the precursor solution, the excess liquid is removed and the substrate is dried, followed by calcination in which the precursor is decomposed into metal oxide cluster or metallic particle in a highly dispersed state.

Figure 4:
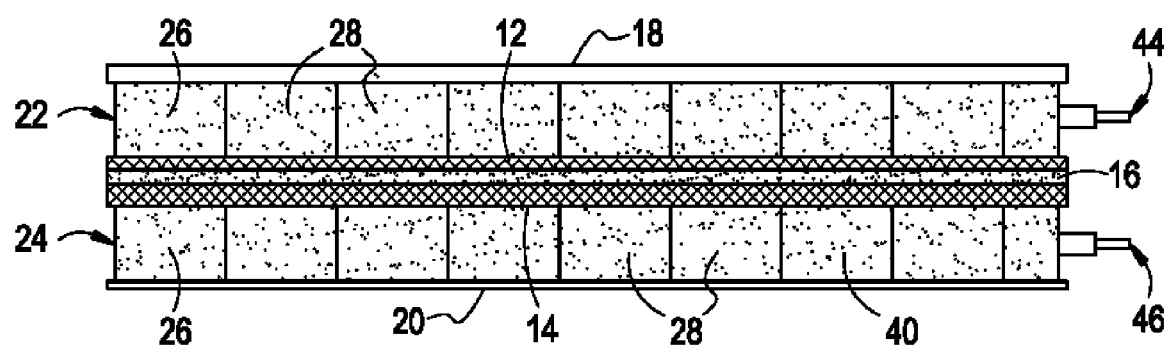
FIG. 4 is a schematic illustration of the SOFC FIG. 1 in operation.

Turning to FIG. 4, the SOFC 10 is illustrated in operation. In operation, the SOFC is equipped with an air inlet 44 for feeding air along the air flow path 36 between the cathode 12 and the cathodic current collector 18 and through the cathodic interconnect 22. The SOFC 10 is also equipped with a fuel inlet 46 for feeding hydrocarbon fuel along a fuel flow path 38 between the anode 14 and the anodic current collector 20 and through the anodic interconnect 24. During operation of the SOFC, oxygen in the air is reduced to oxide ion at the cathode 12 before the oxide ion is transferred to anode through the ion conducting electrolyte 16. The hydrocarbon fuel entering from the inlet 46 undergoes first through a catalytic reaction over the catalyst coating 40 at the surface of anodic interconnect 24. The catalytic reaction decomposes the hydrocarbons to reformate which contains high level of concentration of hydrogen and carbon monoxide. Hydrogen and carbon monoxide are further oxidized at the anode 14 and are combined with the oxide ions migrated from the cathode to form water and carbon dioxide. The depleted air and fuel streams combine at the edge of the SOFC and the unreacted reformate and oxygen will further react and release heat inside of SOFC. The depleted air and reformate stream can also exit the SOFC and combine for combustion in a down stream burner. In practice, SOFC module 10 can be assembled in series to form a SOFC stack.

In the SOFC, a significant amount heat is generated from the internal ohmic resistance and electro-chemical reaction overpotentials. This internally generated heat is utilized by the internal steam reforming reaction, which is an endothermic process.

In one embodiment of this invention, fuel at the anode can be a mixture of steam and one or more hydrocarbon fuels such as methane, gasoline, diesel, or jet fuel. The hydrocarbon and steam mixture enters the anode side of the SOFC 10 through the fuel inlet 46 and the fuel flow path 38. Catalyst on the surface of the anodic interconnect 24 promotes the catalytic reaction between the hydrocarbons and the steam at the SOFC operating temperature, which leads to the formation of hydrogen and carbon monoxide. Hydrogen and carbon monoxide are more facile fuel to be electrochemically oxidized at the anode surface to form carbon dioxide and water and therefore improve the fuel efficiency of the SOFC. The electro-oxidation of the hydrogen and carbon monoxide is also a more clean process with little carbonaceous material formation on the surface of the anode. The water formed inside of anode in the form of steam can further participate the catalytic steam reforming reaction to convert remaining hydrocarbon fuels. Therefore, such a design improves the efficiency and extends the operating life of the SOFC.

In an alternative embodiment, the hydrocarbon fuels can be first partially reformed before entering the anode and interacting the catalytic interconnect. In one example, the hydrocarbons are first partially reformed to a mixture of hydrogen, carbon monoxide, water and unreformed hydrocarbons. This mixture enters the fuel flow path 38 and flows through the anodic interconnect 24. While hydrogen and carbon monoxide are electro-chemically oxidized to generate the electric current at anode surface, the unreformed hydrocarbons will be continually reformed at the surface of catalytic coating 40 or interconnect 24 with the steam generated by the electro-chemical oxidation of hydrogen. The partial reforming prior to SOFC reduces the load and size requirement for the external reforming device. The follow-up internal reforming further improves the yield of hydrogen and carbon monoxide and reduces concentration of hydrocarbons. Steam can be optionally added prior to the fuel mixture entering the anode to promote the catalytic steam reforming reaction.

It should be understood that the foregoing relates to preferred embodiments of the invention and that modifications may be made without departing from the spirit and scope of the invention as set forth in the following claims.

The invention claimed is:

1. Solid oxide fuel cell with internal reforming capability comprising:
   a cathode;
   an anode;
   an electrolyte disposed between the anode and the cathode, wherein the electrolyte is a solid electrolyte comprising a yttria-stabilized zirconia;
   a cathodic current collector;
   an anodic current collector, the cathode, anode and electrolyte disposed between the cathodic current collector and the anodic current collector;
   a cathodic interconnect electrically connecting the cathode to the cathodic current collector, the cathodic interconnect comprising a metallic substrate providing a flow field between the cathode and the cathodic current collector for an oxygen containing gas flow over at least a portion of the cathode; and
   an anodic interconnect electrically connecting the anode to the anodic current collector, the anodic interconnect comprising a metallic substrate providing a flow field between the anode and the anodic current collector for a fuel gas flow over at least a portion of the anode and a catalytic coating on the metallic substrate, the flow field being bounded at least in part by the anode, the anodic current collector, and the metallic substrate, and the catalytic coating on the metallic substrate comprising a catalyst capable of catalytic conversion of a hydrocarbon fuel in the fuel gas to a hydrogen rich reformate such that the hydrogen rich reformate is oxidized at the anode to generate electric power;
   wherein the metallic substrate of the anodic interconnect has an offset plate fin or dimple configuration and includes a first uncoated portion electrically connected to the anode, a second uncoated portion electrically connected to the anodic current collector, and a spacing portion extending between the first and second uncoated portions for spacing the anode from the anodic current collector and forming the space for the fuel gas flow.

2. Solid oxide fuel cell as in claim 1 wherein the metallic substrate of the anodic interconnect is formed of high temperature stainless steel/alloy plate.

3. Solid oxide fuel cell as in claim 1 wherein the metallic substrate of the anodic interconnect includes a plurality of rows of fins having a square wave shaped cross-section, adjacent rows of the plurality of rows of fins being offset from one another.

4. Solid oxide fuel cell as in claim 1 wherein at least a portion of the anode is unobstructed by the anodic interconnect.

5. Solid oxide fuel cell as in claim 1 wherein the catalytic coating further comprises a catalyst support and a catalyst promoter.

6. Solid oxide fuel cell as in claim 1 wherein the catalyst is a steam reforming catalyst.

7. Solid oxide fuel cell as in claim 6 wherein the steam reforming catalyst comprises a transition metal or a precious metal.

8. Solid oxide fuel cell as in claim 6 wherein the steam reforming catalyst comprises a transition metal or a precious metal, and wherein the catalytic coating further comprises a catalyst support comprising a refractory metal oxide and a catalyst promoter comprising an alkali metal oxide or an alkaline earth metal oxide.

* * * * *